United States Patent [19]

Tanaka et al.

[11] Patent Number: 4,791,576
[45] Date of Patent: Dec. 13, 1988

[54] AREA CUTTING METHOD

[75] Inventors: Kunio Tanaka; Yasushi Onishi, both of Tokyo, Japan

[73] Assignee: Fanuc Ltd, Minamitsuru, Japan

[21] Appl. No.: 36,679

[22] PCT Filed: Jul. 17, 1986

[86] PCT No.: PCT/JP86/00368

§ 371 Date: Mar. 16, 1987

§ 102(e) Date: Mar. 16, 1987

[87] PCT Pub. No.: WO87/00649

PCT Pub. Date: Jan. 29, 1987

[30] Foreign Application Priority Data

Jul. 17, 1985 [JP] Japan ................................ 60-157927

[51] Int. Cl.⁴ .......................................... G05B 19/403
[52] U.S. Cl. ............................................... 364/474.29
[58] Field of Search .............. 364/475, 474, 167, 168, 364/169, 170; 409/80; 318/568

[56] References Cited

U.S. PATENT DOCUMENTS 3,766,369  10/1973  Watanabe et al. ............... 364/474 X
4,503,493   3/1985  Burkhart et al. ..................... 364/170
4,621,959  11/1986  Kishi et al. ........................ 364/475 X
4,689,750   8/1987  Kishi et al. ........................ 364/474

Primary Examiner—John R. Lastova
Attorney, Agent, or Firm—Staas & Halsey

[57] ABSTRACT

The present invention relates to an area cutting method for cutting the interior of an area (AR) by moving a tool along a plurality of offset paths (CPT1, CPT2, . . . CPTn) successively offset in an inward direction from a closed curve (OLC) specifying the area (AR). In accordance with the area cutting method, the centroid (W) of the area is found and a check is performed as to whether the centroid lies inside the area. It is also checked whether line segments (L1, L2, L3, . . . ) connecting the centroid with the apices (P1, P2, . . . , P10) of the area intersect the closed curve (OLC'). If the centroid (W) lies within the area and none of the line segments intersect the closed curve, the area is not divided into a plurality of convex polygons even if the area is a concave polygon. Instead, each line segment is partitioned into a predetermined number of partitions and cutting is performed by moving the tool along a plurality of closed paths (CPT1-CPTn) connecting consecutive partitioning points Pi1 through Pi10 (i=a, b, . . . n) of the line segments.

4 Claims, 11 Drawing Sheets

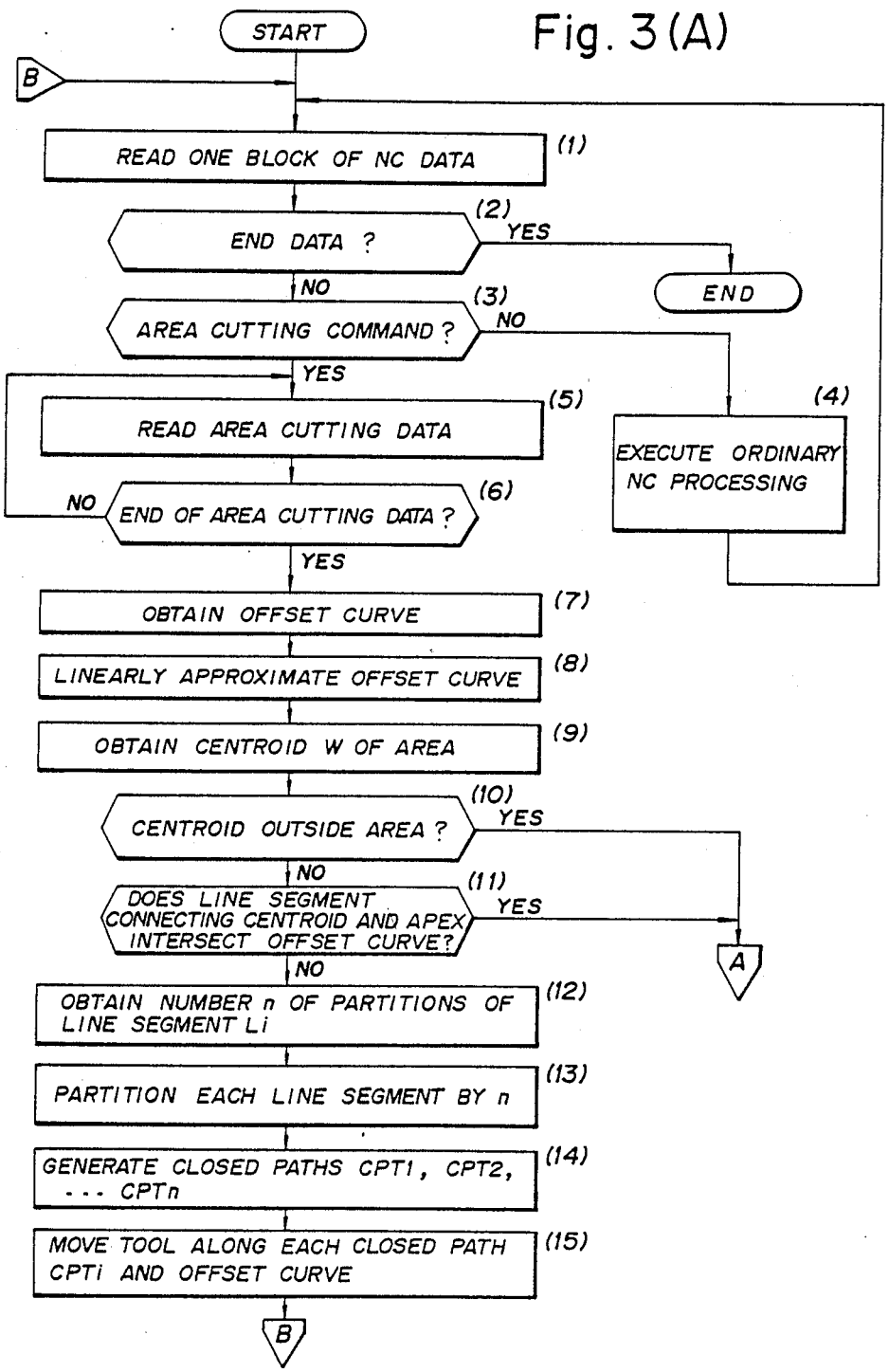

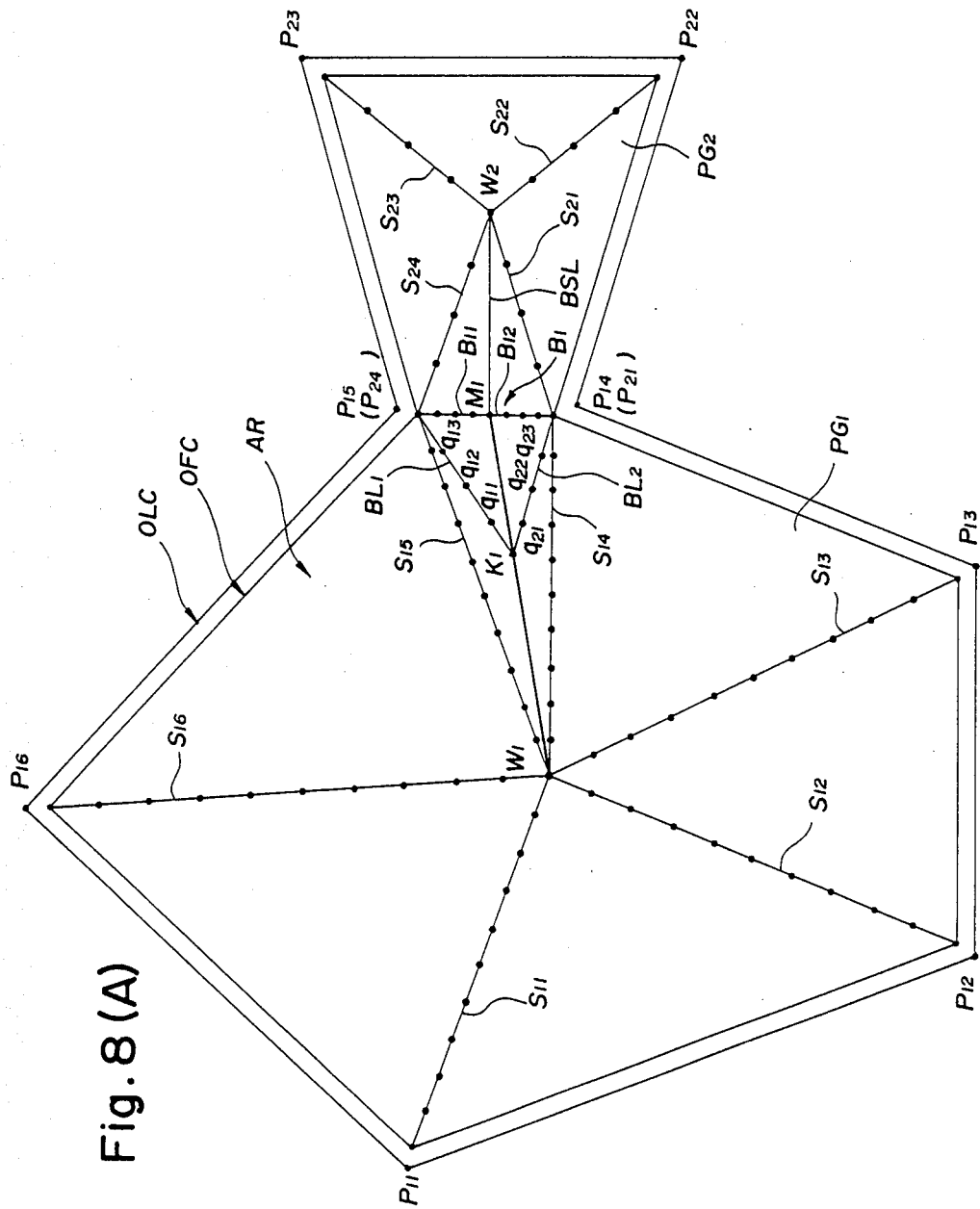

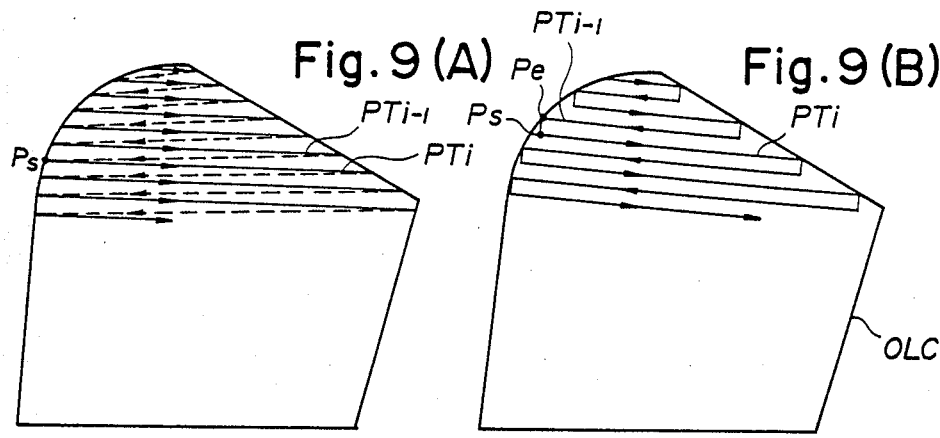
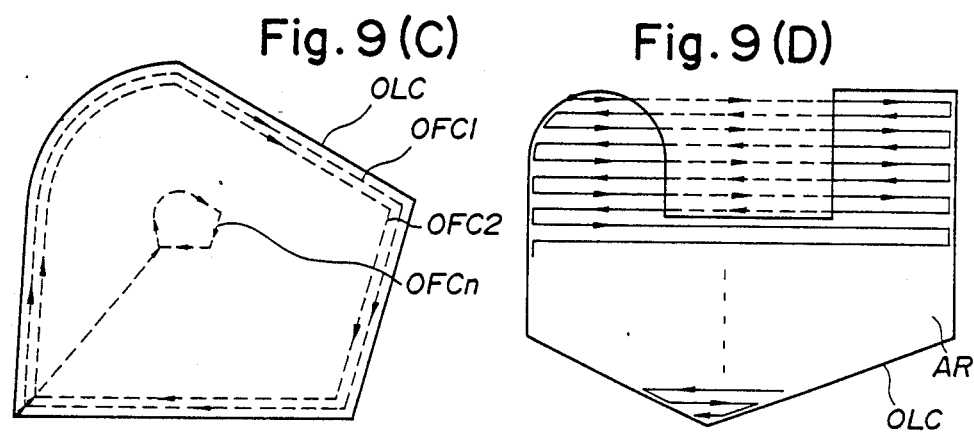
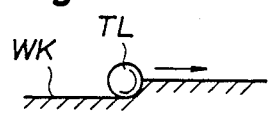 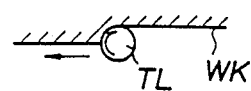
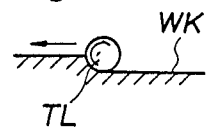 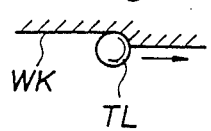

AREA CUTTING METHOD

CROSS-REFERENCE TO RELATED APPLICATION

This application is related to U.S. patent application Ser. No. 37,678, filed concurrently with this application on Mar. 16, 1987.

BACKGROUND OF THE INVENTION

1. Technical Field

This invention relates to an area cutting method and, more particularly, to an area cutting method for cutting the interior of an area bounded by a closed curve.

2. Description of the Related Art

Forms of numerically controlled machining include cutting in which the interior of an area bounded by a closed curve is hollowed out down to a predetermined depth, and die milling in which the interior of an area is die milled. In such machining, as shown in FIG. 9(A), an area cutting method is conventionally carried out by performing cutting along an (i-1)th cutting path PTi-1 in one direction (the direction of the solid line arrow), raising the tool a predetermined amount at the completion of cutting, then positioning the tool directly above a cutting starting point Ps on the next, or i-th, cutting path PTi, thereafter lowering the tool to the cutting starting point Ps, moving the tool along the i-th cutting path PTi in the direction of the solid line arrow, and subsequently repeating the above unidirectional cutting.

Another area cutting method shown in FIG. 9(B) includes, following completion of cutting along the cutting path PTi-1 of the (i-1)th cutting path, moving the tool from a cutting end point Pe to the cutting starting point Ps on the next, or i-th, cutting path, and thereafter performing cutting along the i-th cutting path PTi. Thus, cutting is performed back and forth in the direction of the arrows.

Still another area cutting method shown in FIG. 9(C) includes obtaining offset paths OFC1, OFC2, . . . OFCn offset by predetermined amounts with respect to a curve OLC of an external shape, and moving the tool successively along the offset paths.

However, with the first area cutting method based on unidirectional cutting, the tool must be positioned at the cutting starting point Ps on the i-th cutting path PTi after the completion of cutting along the (i-1)th cutting path PTi-1. This method is disadvantageous in that it results in a long tool traveling distance.

With the second cutting method based on reciprocative cutting, portions are left uncut. In order to cut the uncut portions, the tool must be moved along the external shape curve OLC at completion of the back-and-forth cutting, thereby necessitating both back-and-forth cutting control and cutting control along the shape of the external curve. Accordingly, this method is disadvantageous in that control is complicated. Further, if an area AR has concavities and convexities, as shown in FIG. 9(D), the second method requires movement for achieving positioning indicated by the dashed lines. This is disadvantageous in that tool travelling distance and cutting time are prolonged. In addition, since the cutting process for the outward trip is different from the cutting process for the return trip, cutting cannot be performed efficiently overall. It should be noted that the cutting processes referred to here indicate up cutting and down cutting processes. FIGS. 10(A), (B) show examples of the down cutting process, and FIGS. 10(C), (D) depict examples of the up cutting process. If the workpiece material has been decided, then a cutting method capable of cutting the workpiece efficiently is selected from the up cutting and down cutting processes. However, with the second method, the up cutting process [e.g. FIG. 10(A)] and the down cutting process [e.g. FIG. 10(C)] are always mixed, so that cutting cannot be performed efficiently.

With the third method of cutting along the offset paths, portions are left uncut at, e.g., the central portion of the area, depending upon the contour of the external shape curve. This method is disadvantageous in that dealing with these uncut portions is a complicated task.

Accordingly, in order to eliminate the aforementioned drawbacks of the conventional method, the applicant has proposed a method in which a tool path in the form of a spider web pattern is decided within the area and a tool is moved along the tool path to machine the area. (For example, refer to the specification of U.S. Ser. No. 744,746, now U.S. Pat. No. 4,621,959.) FIGS. 11(A), (B) are views for describing this area cutting method. The area cutting method is composed of the following steps:

(1) For cutting the interior of an area AR bounded by an external shape curve OLC comprising a number of straight lines S1, S2, . . . S6 and a circular arc A1, linearly approximating a circular arc portion A1' of an offset curve OFC offset a predetermined amount from the external shape curve;

(2) dividing an area bounded by the linearly approximated offset curve into a plurality of convex polygons PG1–PG3;

(3) calculating the centroid Wi of each convex polygon and the mid-points M1, M2 of boundary lines B1, B2 of two mutually adjacent convex polygons and generating a base line BL obtained by successively connecting each centroid and each mid-point;

(4) partitioning, into a predetermined number of partitions, straight lines L1–L14 connecting the centroids Wi of the convex polygons and the apices P1–P10 of the convex polygons, and straight lines BL1–BL4 connecting the mid-points M1, M2 and the two ends P1, P4; P4, P7 of the boundary lines bisected by the mid-points;

(5) moving a tool along plural closed paths CPT1, CPT2, . . . obtained by connecting partitioning points $P_{a1}, P_{a2}, \ldots P_{a18}; P_{b1}, P_{b2}, \ldots P_{b18}$ [see FIG. 11(B)], which correspond to the straight lines L1–L14, BL1–BL4, in such a manner that the base line BL is enclosed, and moving the tool along the base line BL, and (6) moving the tool along the offset curve OFC.

According to this method, area cutting can be carried out while moving the tool continuously. This is advantageous in that it eliminates wasted tool movement and shortens cutting time in comparison with the prior-art method. It also does not leave any uncut portions at, e.g., the central part of the area.

In accordance with this proposed method of cutting an area in a spider web-like pattern, however, if the shape of the area is a concave polygon, the area is always divided into a plurality of convex polygons and area cutting is performed upon deciding the tool paths based on each convex polygon.

However, there are cases where it is unnecessary to divide an area into convex polygonal portions even if the shape of the area is a concave polygon. In other words, there are cases where tool paths in the form of a spider web pattern can be decided without dividing an area into convex polygons even if the shape of the area is a concave polygon. Nevertheless, in the prior art, such an area is still divided into a plurality of convex polygons and tool paths are decided based on these convex polygons. For this reason, the processing for deciding the tool paths is complicated and an extended period of time is required to decide the tool paths.

Accordingly, an object of the present invention is to provide a method through which an area can be cut upon deciding tool paths having the form of a spider web pattern without dividing the area into a plurality of convex polygons, even if the shape of the area is a concave polygon.

Another object of the present invention is to provide an area cutting method through which tool paths for cutting an area can be decided with ease in a short period of time.

DISCLOSURE OF THE INVENTION

The present invention provides an area cutting method for cutting the interior of an area by moving a tool along a plurality of offset paths successively offset in an inward direction from a closed curve specifying an area.

In accordance with the area cutting method of the invention, the centroid of the area is found and a check is performed as to whether the centroid lies inside the area. it is also checked whether line segments connecting the centroid with the apices of the area intersect the closed curve.

If the centroid lies within the area and none of the line segments intersect the closed curve, the area is not divided into a plurality of convex polygons even if the area is a concave polygon. Instead, each line segment is partitioned into a predetermined number of partitions and cutting is performed by moving a tool along a plurality of closed paths connecting corresponding partitioning points of the line segments.

BRIEF DESCRIPTION OF THE DRAWINGS

FIGS. 3(A) and 3(B) are a flowchart of processing indicative of the area cutting method of the present invention;

FIGS. 9(A)–9(D) are views of a conventional area cutting method;

FIGS. 10(A)–10(D) are views for describing up cutting and down cutting processes.

DESCRIPTION OF THE PREFERRED EMBODIMENT

Figure 1:
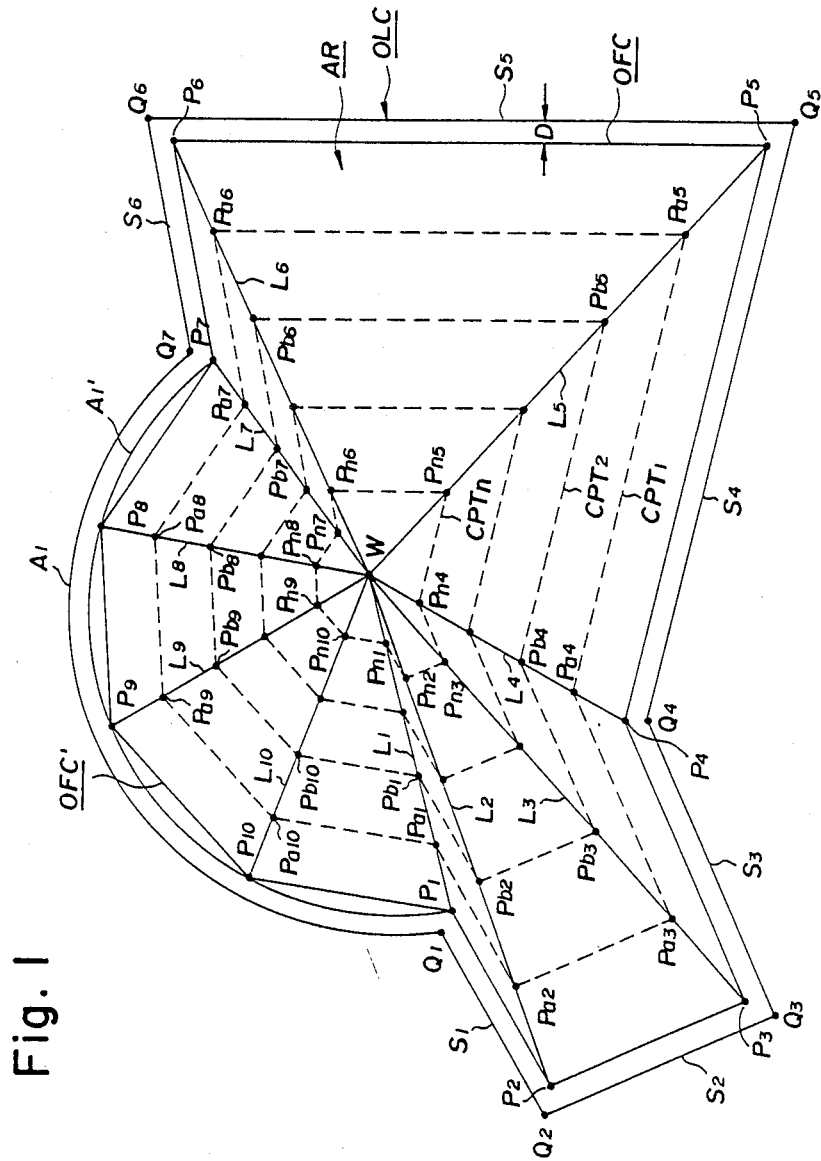
FIG. 1 is a view for describing the general features of an area cutting method according to the present invention.

FIG. 1 is a view for describing the general features of the present invention. In the Figure, AR denotes an area, OLC a closed curve for specifying the area AR, OFC an offset curve, W the centroid of the area, Pi an apex of the area, Li a line segment connecting the centroid with an apex, and CPT1–CPTn represent closed paths.

The centroid W of the area AR bounded by the closed curve OLC is calculated, and a check is performed as to whether the centroid W lies inside the area AR. Taking a clockwise angle as being either positive or negative, $$\sum_{i=1}^{10} \angle P_i W P_{i+1} = a$$

is evaluated. The centroid is judged to lie outside the area when $a=0$ holds and to lie inside the area when $a=2\pi$ holds.

If the centroid W lies within the area, it is checked whether the line segments L1, L2, L3 . . . connecting the centroid W with the each apex Pi (i=1, 2, . . . ) of the area intersect the closed curve OLC.

When the angle in the clockwise direction is taken to be negative or positive, the sign of the angle Pi-1WPi(i=1, 2, . . . n) is checked. If all angles have the same sign, a decision is rendered to the effect that none of the line segments L1–L10 intersect the closed curve. If a sign differs, then it is decided that at least one of the line segments intersects the closed curve.

If the centroid W lies within the area and none of the line segments intersect the closed curve, each line segment is partitioned into a predetermined number of partitions and cutting is performed by moving a tool along the plurality of closed paths CPT1–CPTn connecting corresponding partitioning points Pi1→Pi2→Pi3→Pi4→Pi5→Pi6→Pi7→Pi8→Pi9→Pi10 (i=a, b, . . . n) of the line segments.

Figure 2:
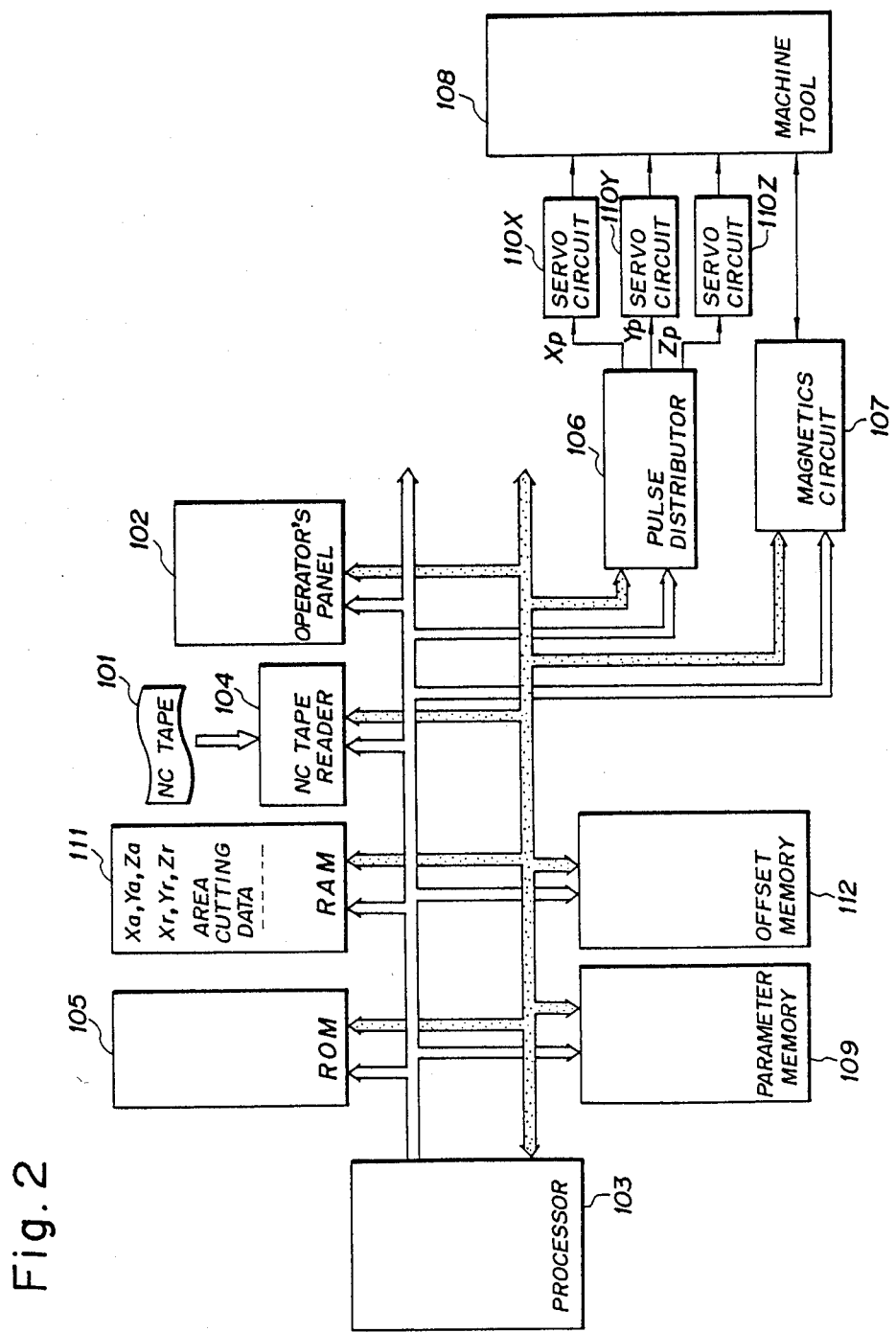
FIG. 2 is a block diagram of an NC system for practicing the method of the present invention.
Figure 3B:
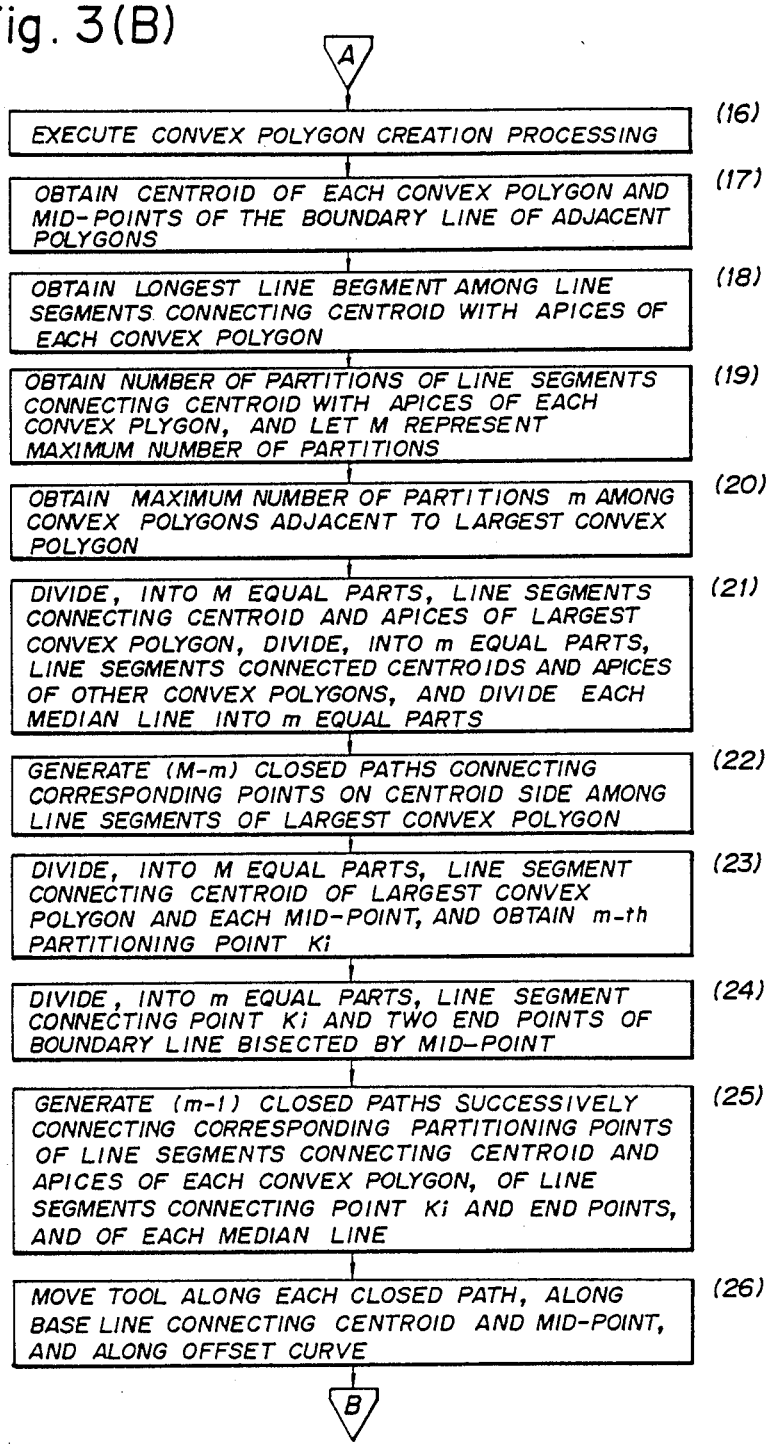

FIG. 2 is a block diagram of an NC system for practicing the method of the present invention, and FIG. 3 is a flowchart of processing. The area cutting method of the present invention will now be described in conjunction with FIGS. 1 through 3.

Area cutting data necessary for area cutting are recorded at appropriate locations on an NC tape or memory (assumed to be an NC tape hereafter) 101. Specifically, in addition to ordinary numerical control data, area cutting instructions, coordinate values $(x_j, y_j)$ of the apices Q1–Q10 of the area, the radius $r_j$ of a circular arc, finishing margin t, cut-in pitch P, cutting velocity fc, and data for identifying the end of the area cutting data, are recorded on the NC tape 101. Note that the positions of the apices and the radius of the circular arc are commanded in sets, e.g., in the form $(x_j, y_j, r_j)$, with $r_j=0$ being commanded in the case of straight lines. Accordingly, in the area cutting of the area AR shown in FIG. 1, the area is specified by

| $Xx_1$ | $Yy_1$ | R0; |
| $Xx_2$ | $Yy_2$ | R0; |
| $Xx_3$ | $Yy_3$ | R0; |

-continued

| | | |
|---|---|---|
| Xx₄ | Yy₄ | R0; |
| Xx₅ | Yy₅ | R0; |
| Xx₆ | Yy₆ | R0; |
| Xx₇ | Yy₇ | Rr; |

(1) When a cycle start button on an operator's panel 102 is pressed to start the system, a processor 103 causes an NC data reader 104 to read one block of NC data from an NC tape 101.

(2) Next, under the control of a control program stored in a ROM 105, the processor 103 decodes the read NC data and determines whether the NC data are indicative of program end "M02" or tape end "M30".

Processing is ended if the data are indicative of program end or tape end.

(3) If the data are indicative of program end, the processor determines whether the NC data are indicative of an area cutting command.

(4) If the NC data are path data and not an area cutting command, then path processing is executed. If an item of NC data is an M-, S- or T-function instruction to be delivered to the machine side, then the instruction is applied to a machine tool 108 through a magnetics circuit 107.

When an item of NC data is path data, the processor 103 finds incremental values Xi, Yi, Zi along the respective axes as well as amounts of movement $\Delta X$, $\Delta Y$, $\Delta Z$ along the respective axes per unit time $\Delta T$ based on feed rate F. These are inputted to a pulse distributor 106.

On the basis of the input data, the pulse distributor 106 performs a simultaneous three-axis pulse distribution calculation to generate distributed pulses Xp, Yp, Zp. These are delivered to servo circuits 110X, 110Y, 110Z for the respective axes to transport the tool along the cutting path.

The processor 103, in accordance with the following formulae, updates the present position $X_a$, $Y_a$ $Z_a$ every $\Delta T$ sec, $X_a$, $Y_a$, $Z_a$ having been stored in a RAM 111:

$$X_a \pm \Delta X \rightarrow X_a \quad (1a)$$

$$Y_a \pm \Delta Y \rightarrow Y_a \quad (1b)$$

$$Z_a \pm \Delta Z \rightarrow Z_a \quad (1c)$$

The sign depends upon the direction of movement. Similarly, in accordance with the following formulae, the processor 103 updates remaining traveling distances $X_r$, $Y_r$, $Z_r$ (the initial values of which are the incremental values $X_i$, $Y_i$, $Z_i$, respectively) every $\Delta T$ sec, $X_r$, $Y_r$, $Z_r$ having been stored in the RAM 111:

$$X_r - \Delta X \rightarrow X_r \quad (2a)$$

$$Y_r - \Delta Y \rightarrow Y_r \quad (2b)$$

$$Z_r - \Delta Z \rightarrow Z_r \quad (2c)$$

When the following condition is established:

$$X_r = Y_r = Z_r = 0 \quad (3)$$

the processor 103 treats this as indicating that the movable element has arrived at a target position and causes the NC data reader 104 to read the next item of NC data.

(5) If an item of NC data read from the NC tape 101 is found to be an area cutting command, the processor 103 causes the NC data reader 104 to read the area cutting data and store the data in the RAM 111 until the code indicating the end of the area cutting data is read out.

(6) Whenever an item of NC data is read, the processor 103 checks the NC data to determine whether it is a code indicative of the end of the area cutting data.

(7) If the NC data is indicative of the end of area cutting data, the processor 103 calculates the curve OFC, which is offset from the curve OLC (FIG. 1) of the external shape by a distance D(=ra+t), the latter being obtained by adding the tool radius ra and the finishing margin t. It should be noted that the tool radius ra is obtained by reading a radius value corresponding to a commanded tool number from an offset memory 112, which stores the correspondence between tool numbers and tool radii.

Figure 4:
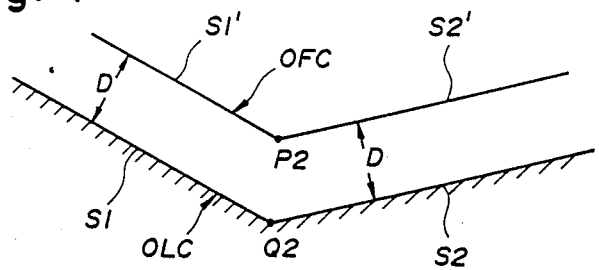
FIG. 4 is a view for describing a method of calculating an offset curve.

The offset curve OFC is found through the following processing. Specifically, as shown in FIG. 4, let two straight lines specifying the curve OLC of the external shape be S1 and S2. Straight lines S1', S2' offset from the straight lines S1, S2, respectively, by the distance D are found. The intersection P2 of the straight lines S1', S2' is then found. The intersection P2 is one point specifying the offset curve OFC. Accordingly, if points of intersection are found in a similar manner and stored in the RAM 111, the offset curve OFC will be obtained.

(8) The processor 103 now linearly approximates a circular arc portion of the offset curve OFC if the curve has a circular arc portion.

In performing the linear approximation processing, it is so arranged that the maximum distance between the circular arc portion and the straight line takes on a value smaller than the cut-in pitch. FIG. 5 is a view for describing the linear approximation processing.

Figure 5A:
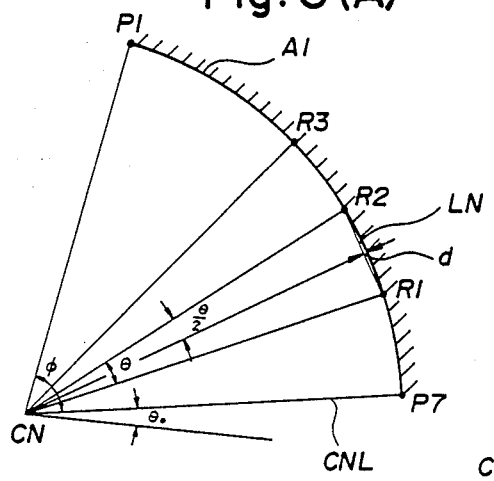
FIGS. 5(A) and 5(B) are view of methods of linear approximation for machining the outside and inside of a circular arc portion, respectively.

For a case where the inner side of the circular arc A1 is the area to be cut, as shown in FIG. 5(A), the maximum distance d between the circular arc A1 and the straight line (chord) LN is given by $$d = r - r \cdot \cos(\theta/2) \quad (4)$$

where the radius of the arc is r and the central angle of the chord LN is $\theta$. Accordingly, the central angle $\theta$ for which $d \leq P$ holds, namely the central angle $\theta$ that satisfies the relation $$\cos(\theta/2) \geq 1 - (P/r) \quad (5)$$

is found, the central angle $\phi$ of the circular arc A1 is partitioned at the angle $\theta$ and the coordinate values of each partitioning point $R_i$ are stored in the RAM 111. This ends the processing for linear approximation of the circular arc portion.

Figure 5B:
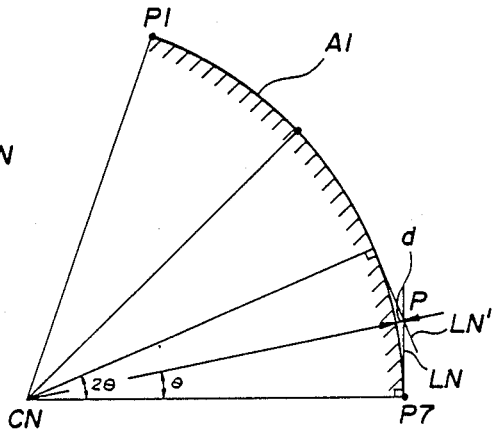

For a case where the outer side of a circular arc A1 is the area to be cut, as shown in FIG. 5(B), the maximum distance d between the circular arc A1 and the intersection P between the straight lines LN, LN' is given by $$d = (r/\cos\theta) - r \quad (7)$$

Accordingly, the angle $\theta$ for which $d \leq P$ holds, namely the angle $\theta$ that satisfies the relation $$\cos\theta \geq r/(r+P) \quad (8)$$

is found, the point $R_i$ linearly approximating the circular arc portion on the basis of $\theta$ is found, and this is stored in the RAM 111. This ends the processing for linear approximation.

(9) When the linear approximation processing ends, the processor 103 obtains the centroid W of the area bounded by an offset curve OFC'.

Figure 6:
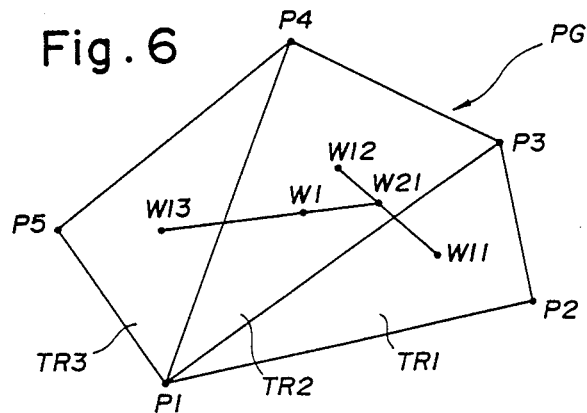
FIG. 6 is a view for describing a method of calculating a centroid.

The centroid W of the region is calculated through processing which will now be described. Assume that the centroid of the area PG shown in FIG. 6 is to be found. The area PG is broken down into a plurality of triangles TR1 through TR3 and the centroids W11 through W13 and areas SQ1 through SQ3 of the respective triangles are calculated. Next, a point W21 that devides a line segment W12W11 connecting the centroids W11, W12 into the ratio SQ1:SQ2 (area ratio) is found. Note that the point W21 is the centroid of a quadrilateral P1P2P3P4. After the point W21 is calculated, a point W is found that divides a line segment W13W21 into the area ratio (SQ1+SQ2):SQ3. The point W is the centroid of the convex polygon PG.

(10) When the centroid W of the area has been found through the foregoing process, it is determined whether the centroid W lies outside the region AR. This is done in the following manner: Taking a counter-clockwise angle as being positive, $$\sum_{i=1}^{10} \angle P_i W P_{i+1} = a \qquad (9)$$

is evaluated (where P11=P1). The centroid is judged to lie
  (i) outside the area when a=0 holds;
  (ii) inside the area when a=$2\pi$ holds; and
  (iii) on the offset curve OFC' when $0 < a < 2\pi$ holds.

Figure 7A:
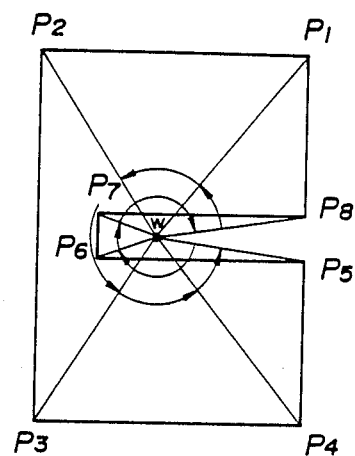
FIG. 7(A) exemplifies the shape of an area for which the centroid lies outside.

FIG. 7(A) illustrates an example in which the centroid W lies outside the area. It will be understood that the sum a of the angles obtained in accordance with the Eq. (9) is zero.

(11) If the centroid W lies inside the area, it is checked whether the line segment Li(i=1, 2, ... 10) connecting the centroid W with the each apex Pi (i=1, 2, ... 10) of the area intersects the closed curve OLC'. This is done in the following manner: Taking a counter-clockwise angle as being positive, the sign of the angle $\angle P_{i-1} W P_i$ (i=1, 2, ... n) is checked. If all angles have the same sign, a decision is rendered to the effect that none of the line segments (L1–L10) intersect the closed curve OFC'. If a sign differs, then it is decided that at least one of the line segments intersects the closed curve.

Figure 7B:
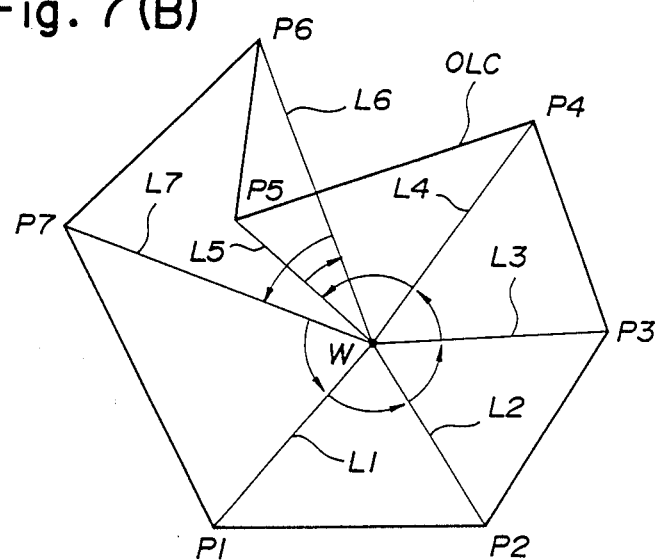
FIG. 7(B) illustrates an example of a shape for which a line segment connecting the centroid and an apex intersects a closed curve.

FIG. 7(B) illustrates an example of the shape of an area in which one line segment intersects the offset curve OFC'; only the angle $\angle P5WP6$ is a clockwise angle. The line segment L6 connecting the centroid W and the apex A6 intersects the offset curve OFC'.

(12) If none of the line segments L1–L10 intersect the offset curve OFC', then the longest line segment 1 among the line segments L1–L10 is found, the largest integer n that satisfies the relation $$P \geq 1/n$$

is found and the integer n is adopted as a number of partitions. In the above relation, P represents the cut-in pitch.

(13) The coordinates of the following partitioning points, which divide the line segments L1–L10 into n parts, are obtained and stored in the RAM 111:

Pa1, Pb1, ... Pn1;
Pa2, Pb2, ... Pn2;
Pa3, Pb3, ... Pn3;
.
.
Pa10, Pb10, ... Pn10;

(14) When the coordinate values of the partitioning points of each line segment have been obtained, a plurality of closed paths CPT1, CPT2, ... CPTn are generated which connect the following corresponding partitioning points of these line segments:

Pa1, Pa2, Pa3 ... Pa10;
Pb1, Pb2, Pb3 ... Pb10;
.
.
Pn1, Pn2, Pn3 ... Pn10;

(15) When the closed paths have been generated, the processor 103 causes the tool to be moved along the generated closed paths and finally along the offset curve OFC', thereby cutting the area AR.

More specifically, by using the coordinate values of the starting point Pa1 of the first closed path CPT1 stored in the RAM 111, the processor 103 obtains numerical data (incremental values between an initial position and the starting point Pa1) for making the tool approach the starting point Pa1 from the initial position, and thereafter executes the aforementioned path processing using the incremental values. When the approach is completed, the processor moves the tool to the point Pa2 along the first closed path CPT1 in a cutting feed mode and thereafter successively moves the tool along the first closed path in the manner Pa2→Pa3→Pa4 ... →Pa10→Pa1 to perform cutting. When the cutting along the first closed path ends, the tool is shifted to the point Pb1(Pa1→Pb1) in the cutting feed mode and cutting is subsequently performed in a similar manner along the second closed path CPT2, third closed path, ... n-th closed path CPTn. The tool is finally moved along the offset curve in accordance with the data specifying the offset curve OFC' stored in the RAM 111. This ends the area cutting processing. Thereafter, the next item of NC data is read from the NC tape and the foregoing processing is repeated.

Although a case has been described where the tool movement sequence is CPT1→CPT2→ ... →CPTn→OFC' when performing cutting, it is permissible to perform cutting in the sequence CPTn→CPT2→ ... →CPT1→OFC'.

(16) If it is found in steps (10), (11) that the centroid lies outside the area or that a line segment connecting the centroid and an apex intersects the offset curve, then the area bounded by the offset curve is divided into a plurality of convex polygons. For a description of processing for dividing an area into convex polygons, see the specification of U.S. Ser. No. 776,205, now U.S. Pat. No. 4,706,201.

Figure 8:
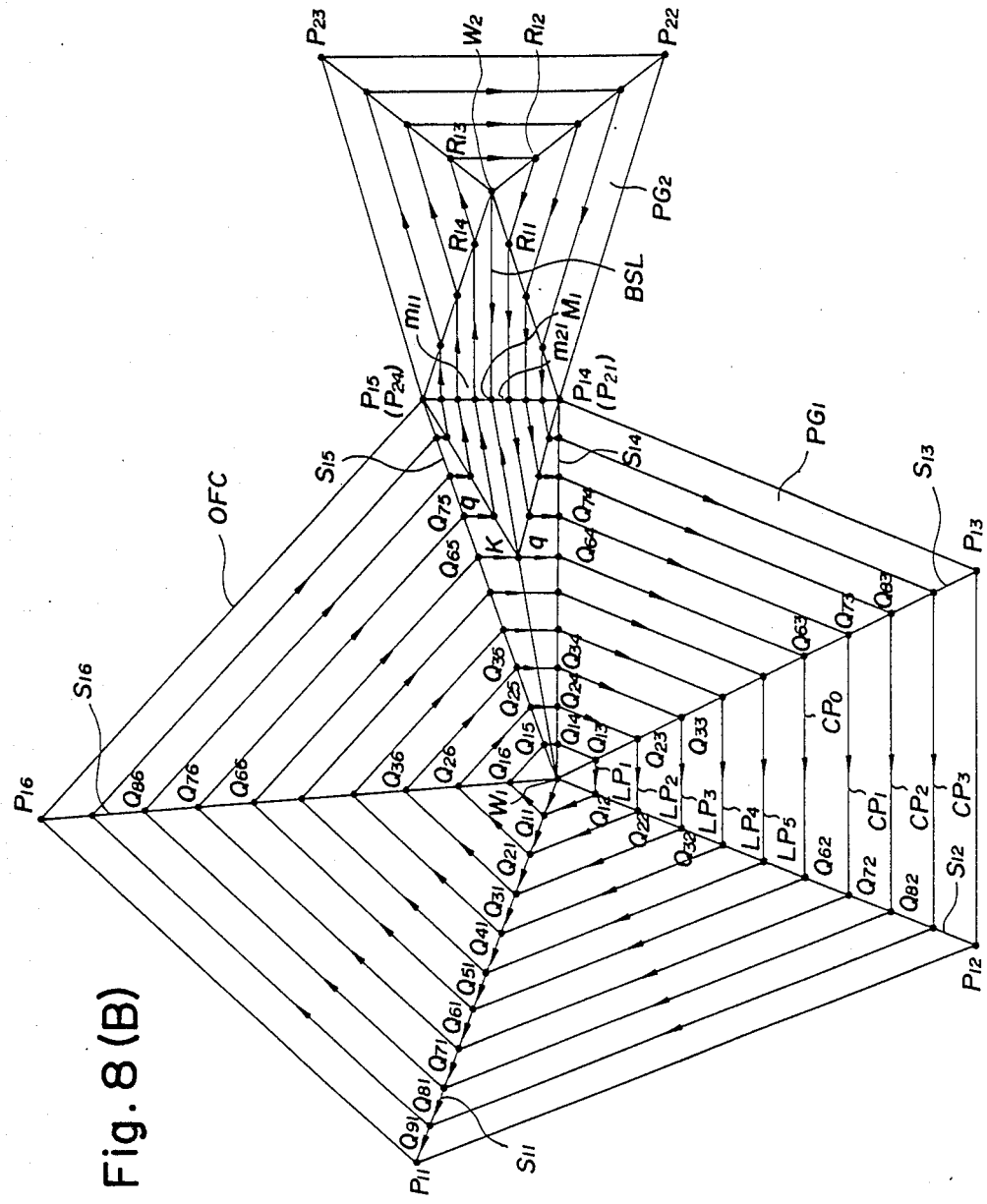
FIGS. 8(A) and 8(B) are views for describing an area cutting method in a case where an area is divided into a plurality of convex polygons.
Figure 11A:
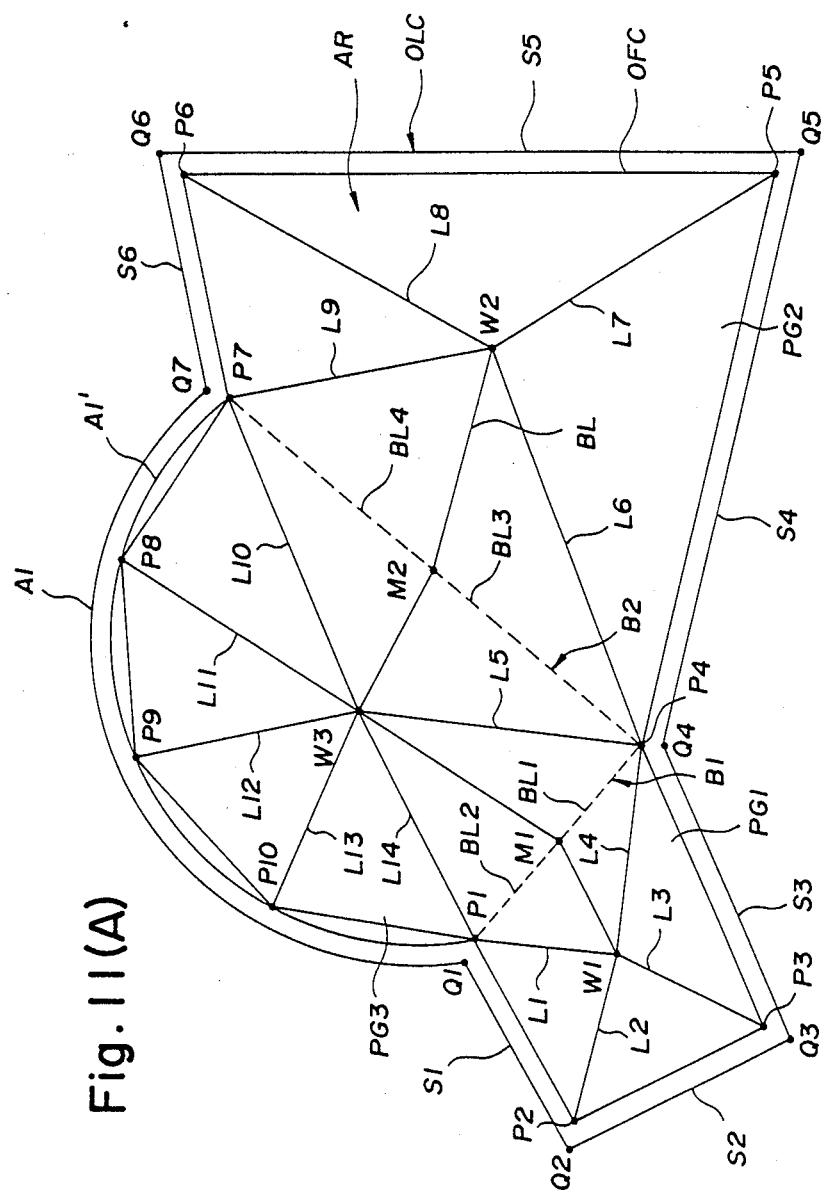
FIGS. 11(A) and 11(B) are views for describing a previously proposed spider web pattern area cutting method.
Figure 11B:
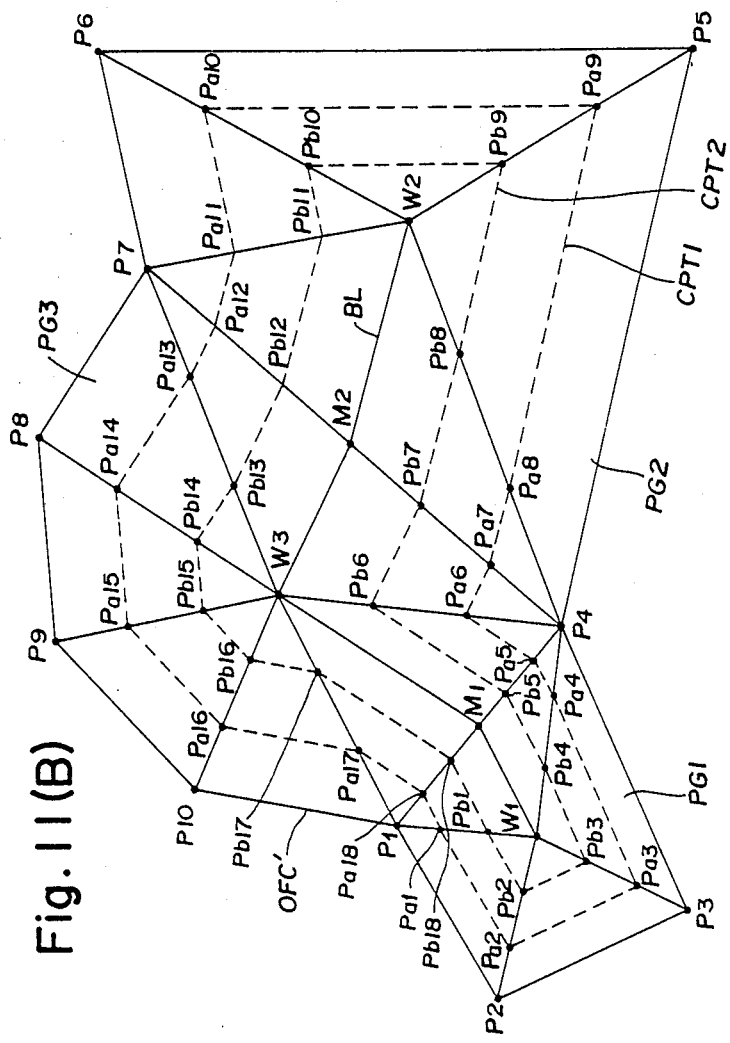

The description that follows will deal with an area having the shape shown in FIGS. 8(A) and 8(B). Two convex polygons will be created by convex polygon creation processing.

(17) When the processing for creating the convex polygons ends, the processor 103 calculates the centroids W1, W2 [see FIG. 8(A)] of the respective convex polygons PG1, PG2 and the mid-point Mi(=M1) of the boundary line Bi (i=1) of two mutually adjacent convex polygons. It should be noted that a curve successively connecting the centroids W1, W2 and midpoint M1 is referred to as a base line BSL.

(18) Thereafter, for each of the convex polygons PG1, PG2, the processor 103 finds the line segment having the longest length among the line segments (S11–S16; S21–S24) connecting the respective centroids and apices. In the embodiment of FIGS. 8(A) and 8(B), line segment S16 is the longest for convex polygon PG1 and line segment S23 is the longest for convex polygon PG2.

(19) Next, the processor finds a number of paritions N1 for which a length of a partitioned line segment obtained by equally partitioning the longest line segment S16 will have a value closest to the cut-in pitch P without exceeding the cut-in pitch P. Similarly, the processor finds a number of partitions N2 with regard to the longest line segment S23. Thus, the processor 103 obtains a number of partitions Ni for each longest line segment (i=1, 2, ...).

Thereafter, the processor 103 obtains the largest number of partitions M and the largest convex polygon. In the embodiment of FIGS. 8(A) and 8(B), M=10 and the largest convex polygon is PG1.

(20) The processor 103 then finds a maximum number m of partitions from among numbers Ni of partitions of convex polygons adjacent the largest convex polygon. Since PG2 is the only adjacent convex polygon in the embodiment of FIGS. 8(A) and 8(B), the number of partitions of this convex polygon is m; hence, m=4.

(21) When m has been found, the line segments S11–S16 connecting the centroid W1 and apices P11–P16 of the largest convex polygon PG1 are each divided into M equal parts, the line segments S21–S24 connecting the centroid W2 and apices S21–S24 of the adjacent convex polygon PG2 are each divided into m equal parts, and median lines B11, B12 connecting a mid-point Mi (=M1) of a boundary line Bi (=B1) with the two end points P14, P15 of the boundary line are each divided equally by m.

(22) When the partitioning points have been obtained, the processor 103 generates (M-m-1) closed paths LP1–LP5 [see FIG. 8(B)] successively connecting corresponding partitioning points Qi1→Qi6→Qi5→Qi4→Qi3→Qi2→Qi1(i=1, 2, ... 5), on the centroid side, of the line segments S11–S16 connecting the centroid W1 and apices P11–P16 of the largest convex polygon PG1.

(23) The processor thenceforth divides, into M equal parts, the line segment W1M1 connecting the centroid W1 and mid-point M1 of the largest convex polygon PG1, and obtains an m-th partitioning point Ki (=K1) counting from the mid-point side [see FIG. 8(A)].

(24) When the partitioning point K1 has been found, the processor obtains partitioning points q11–q13, q21–q23 which respectively divide, into m equal parts, two line segments BL1, BL2 connecting the point K1 with the two end points P15, P14 of boundary line B1, which is bisected by the mid-point M1.

(25) Thereafter, the processor 103 generates (m-1) closed paths CP1–CP3 successively connecting corresponding partitioning points of line segments Sij(S1-1–S16, S21–S24) connecting the centroid and apices of each convex polygon, of the two line segments BL1, BL2 connecting the point Ki(K1) and points P14, P15, and of the median lines B1, B2. Note that the closed path CP1 is Q71→Q76→Q75→q11→m11→R14→R13→R12→R11→m21→q21→Q74→Q73→Q72→Q71, and closed path CP2 is Q81→Q86→Q85→q12→m12→R24→R23→R22→R21→m22→q22→Q84→Q83→Q82→Q81. The closed path CP3 is similarly generated. Further, CPo is Q61→Q66→Q65→K1→M1→W1→M1→K1→Q64→Q63→Q62→Q61.

(26) When the closed paths LP1–LP3 and CP0–CP3 have been obtained as set forth above, the processor 103

(a) moves the tool first to the centroid W1, (b) then moves the tool along the closed paths LP1→LP2→LP3→LP4→LP5→CP0→CP1→CP2→CP3, and (c) finally moves the tool along the offset curve OFC, thereby completing the cutting of area AR.

Accordingly, by using the coordinate values of the starting point W1 of base line BSL stored in the RAM 111 through the above-described processing, the processor 103 obtains numerical data (incremental values between an initial position and the starting point W1) for making the tool approach the starting point W1 from the initial position, and thereafter executes ordinary path control using the incremental values.

When the approach is completed, the processor 103 moves the tool to the point Q11, then moves the tool along the first closed path LP1 in a cutting feed mode and thereafter moves the tool successively along LP2, LP3, ... LP5, CP0, CP1, CP2, ... CP3 in a similar manner to perform cutting.

Finally the tool is moved along the offset curve OFC in accordance with the data specifying the offset curve OFC stored in the RAM 111. This ends the area cutting processing. Thereafter, the next item of NC data is read from the NC tape and the foregoing processing is repeated.

Though a case has been described where the tool movement sequence is LP1→LP2 . . . LP5→CP0→CP1→CP2→CP3 when performing cutting, it is permissible for the sequence to be reversed.

The present invention is not limited to the illustrated embodiment. It is possible to adopt an arrangement wherein an NC tape (NC data) containing tool path data for area cutting is prepared through the above-described method and the NC data are fed into an NC unit to cut the area.

According to the present invention, in a method of cutting an area in a spider web-like pattern, a check is performed to determine whether the area should be divided into a plurality of convex polygons. If division is not necessary, tool paths in the form of a spider web pattern are decided without dividing the area and cutting is performed by moving the tool along the paths. As a result, processing for deciding the paths is facilitated and the time needed for deciding the paths and for machining can be shortened.

What is claimed is:

1. An area cutting method for cutting the interior of an area bounded by a closed curve, comprising the steps of:

a first step of calculating a centroid of the area bounded by said closed curve;

a second step of checking whether said centroid lies inside the area;

a third step of checking whether line segments connecting the centroid with respective apices of the area intersect the closed curve if the centroid lies inside the area;

a fourth step of partitioning each line segment into a predetermined number of partitions if the centroid lies inside the area and, moreover, none of the line segments intersect the closed curve; and a fifth step of moving a tool along a plurality of closed paths connected by corresponding partitioning points of said line segments.

2. An area cutting method according to claim 1, wherein said second step comprises:

a step of evaluating $$\sum_{i=1}^{n} \angle P_i W P_{i+1} = a$$

where the centroid of the area is represented by W, the apices of the area are successively represented by P1, P2, P3 ... Pn, and a clockwise angle is either positive or negative, and a step of rendering a decision to the effect that the centroid lies outside the area when $a=0$ holds and inside the area when $a=2\pi$ holds.

3. An area cutting method according to claim 1, wherein said third step comprises:

a step of checking the sign of an angle $\angle P_i W P_{i+1}$ ($i=1, 2, \ldots n$) when a clockwise angle is positive or negative, and a step of rendering a decision to the effect that line segments do not intersect the closed curve when all angle signs are the same, and to the effect that a line segment does intersect the closed curve when the sign is different.

4. An area cutting method according to claim 1, further comprising a sixth step of obtaining tool paths upon dividing the area into a plurality of convex polygons in a case where the centroid lies outside the closed curve or in a case where any of the line segments connecting the centroid with the apices of the area intersects the closed curve even if the centroid lies inside the area.

* * * * *

UNITED STATES PATENT AND TRADEMARK OFFICE
CERTIFICATE OF CORRECTION

PATENT NO. : 4,791,576

DATED : December 13, 1988

INVENTOR(S) : Tanaka et al.

It is certified that error appears in the above-identified patent and that said Letters Patent is hereby corrected as shown below:

Col. 3, line 29, "it" should be --It--.

Col. 7, line 60, "1" should be -- $\ell$ --;

line 64, "$\geq$1" should be --$\geq \ell$ --.

Signed and Sealed this

Twenty-third Day of May, 1989

Attest:

DONALD J. QUIGG

*Attesting Officer*      *Commissioner of Patents and Trademarks*